United States Patent
Imai et al.

(10) Patent No.: US 9,790,828 B2
(45) Date of Patent: Oct. 17, 2017

(54) EXHAUST PURIFICATION SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Daichi Imai, Sunto-gun (JP); Kazuhiro Itou, Mishima (JP); Hiromasa Nishioka, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 15/036,540

(22) PCT Filed: Sep. 26, 2014

(86) PCT No.: PCT/JP2014/076476
§ 371 (c)(1),
(2) Date: May 13, 2016

(87) PCT Pub. No.: WO2015/072242
PCT Pub. Date: May 21, 2015

(65) Prior Publication Data
US 2016/0298511 A1 Oct. 13, 2016

(30) Foreign Application Priority Data
Nov. 18, 2013 (JP) ................. 2013-238210

(51) Int. Cl.
*F01N 3/02* (2006.01)
*F01N 3/022* (2006.01)
(Continued)

(52) U.S. Cl.
CPC .......... *F01N 3/0222* (2013.01); *F01N 3/021* (2013.01); *F01N 3/0253* (2013.01); *F01N 9/002* (2013.01);
(Continued)

(58) Field of Classification Search
CPC ...... F01N 3/0222; F01N 3/0253; F01N 9/002; F01N 3/021
(Continued)

(56) References Cited

U.S. PATENT DOCUMENTS

2009/0229259 A1* 9/2009 Mizutani .............. B01D 53/944
60/297
2009/0239029 A1* 9/2009 Yamaguchi ........... F01N 3/0222
428/116
(Continued)

FOREIGN PATENT DOCUMENTS

CN 102003257 A 4/2011
EP 2 103 342 A1 9/2009
(Continued)

*Primary Examiner* — Jason Shanske
(74) *Attorney, Agent, or Firm* — Finnegan, Henderson, Farabow, Garrett & Dunner, LLP

(57) ABSTRACT

The risk of a particulate filter from being damaged is reduced while an increase in pressure loss of the particulate filter due to ash is suppressed. Micropore zones are defined at upstream sides of partition walls of a particulate filter and macropore zones are defined at downstream sides of partition walls. The pore size of the partition walls at the micropore zones is set so that the particulate matter and the ash can be trapped by the partition walls at the micropore zones, while the pore size of the partition walls at the macropore zones is set so that the ash can pass through the partition walls at the macropore zones. When the difference dQPM between the quantity of the particulate matter which is trapped at the micropore zones and the quantity of particulate matter which is trapped at the macropore zones exceeds a predetermined threshold value, PM removal control is executed.

9 Claims, 7 Drawing Sheets

(51) Int. Cl.
    *F01N 9/00*     (2006.01)
    *F01N 3/021*    (2006.01)
    *F01N 3/025*    (2006.01)
(52) U.S. Cl.
    CPC ...... *F01N 2330/06* (2013.01); *F01N 2330/60* (2013.01); *F01N 2510/068* (2013.01); *F01N 2510/0682* (2013.01); *F01N 2560/08* (2013.01); *Y02T 10/20* (2013.01); *Y02T 10/47* (2013.01)
(58) Field of Classification Search
    USPC .......................................................... 60/311
    See application file for complete search history.

(56) References Cited

U.S. PATENT DOCUMENTS

| | | | | |
|---|---|---|---|---|
| 2009/0247396 A1* | 10/2009 | Mizutani | ............. | B01D 53/944 502/100 |
| 2011/0047982 A1* | 3/2011 | Chen | ................ | F01N 3/023 60/286 |
| 2012/0107203 A1* | 5/2012 | Arnold | ............. | B01J 37/0246 423/213.5 |

FOREIGN PATENT DOCUMENTS

| | | |
|---|---|---|
| JP | 2004-239199 | 8/2004 |
| JP | 2012-117487 | 6/2012 |
| WO | WO 2010/112781 A1 | 10/2010 |

* cited by examiner

EXHAUST PURIFICATION SYSTEM FOR INTERNAL COMBUSTION ENGINE

CROSS-REFERENCE TO RELATED APPLICATIONS

This application is a national phase application of International Application No. PCT/JP2014/076476, filed Sep. 26, 2014, and claims the priority of Japanese Application No. 2013-238210, filed Nov. 18, 2013, the content of both of which is incorporated herein by reference.

TECHNICAL FIELD

The present invention relates to an exhaust purification system for an internal combustion engine.

BACKGROUND ART

Known in the art is a particulate filter for trapping particulate matter which is contained in exhaust gas, wherein the particulate filter is provided with alternately arranged exhaust gas inflow passages and exhaust gas outflow passages and porous partition walls which separate these exhaust gas inflow passages and exhaust gas outflow passages from each other, micropore zones are defined at upstream sides of the partition walls, macropore zones are defined at downstream sides of the partition walls, a pore size of the partition walls in the micropore zones is set so that particulate matter and ash can be trapped by the partition walls at the micropore zones, a pore size of the partition walls in the macropore zones is set so that ash can pass through the partition walls at the macropore zones, and the partition walls at the micropore zones and the partition walls at the macropore zones are integrally formed (see PTL 1). In this particulate filter, the ash passes through the partition walls at the macropore zones, therefore the amount of the ash which is deposited on the particulate filter is kept down. As a result, the pressure loss of the particulate filter is kept from increasing due to the ash.

On the other hand, known in the art is an exhaust purification system for internal combustion engine which executes PM removal control which increases the temperature of the particulate filter to a PM removal temperature and maintains the same PM removal temperature while maintaining the particulate filter in an oxidizing atmosphere in order to remove the particulate matter which is trapped on the particulate filter.

CITATION LIST

Patent Literature

PTL 1: Japanese Patent Publication No. 2004-23199A

SUMMARY OF INVENTION

Technical Problem

In the above-mentioned particulate filter, the particulate matter which flows into the particulate filter is mainly trapped on the partition walls at the micropore zones and part of the particulate matter is trapped on the partition walls at the macropore zones. In other words, a relatively large amount of particulate matter is trapped at the partition walls at the micropore zones, while a relatively small amount of particulate matter is trapped at the partition walls at the macropore zones. In this case, if PM removal control is executed, at the partition walls at the micropore zones, a relatively large amount of particulate matter is oxidized, so a relatively large amount of heat is generated and therefore the partition walls at the micropore zones greatly rise in temperature. As opposed to this, at the partition walls at the macropore zones, the quantity of particulate matter which is oxidized is relatively small, therefore the partition walls at the macropore zones do not increase that much in temperature. As a result, a large temperature difference may be occur between the partition walls at the micropore zones and the partition walls at the macropore zones and therefore the particulate filter is liable to crack.

Solution to Problem

According to the present invention, there is provided an exhaust purification system for an internal combustion engine which arranges a particulate filter for trapping particulate matter which is contained in exhaust gas in an engine exhaust passage, where the particulate filter is provided with alternately arranged exhaust gas inflow passages and exhaust gas outflow passages and porous partition walls which separate these exhaust gas inflow passages and exhaust gas outflow passages from each other, micropore zones are defined at upstream sides of the partition walls, macropore zones are defined at downstream sides of the partition walls, a pore size of the partition walls in the micropore zones is set so that particulate matter and ash can be trapped by the partition walls at the micropore zones, a pore size of the partition walls in the macropore zones is set so that ash can pass through the partition walls at the macropore zones, and the partition walls at the micropore zones and the partition walls at the macropore zones are integrally formed, characterized in that, when the difference between the quantity of the particulate matter which is trapped on the partition walls at the micropore zones and the quantity of particulate matter which is trapped on the partition walls at the macropore zones exceeds a predetermined threshold value, PM removal control, which increases the temperature of the particulate filter to a PM removal temperature and maintains the same to the PM removal temperature while maintaining the particulate filter in an oxidizing atmosphere in order to remove the particulate matter on the particulate filter, is executed.

Preferably, PM removal control is executed when the total amount of the particulate matter which is trapped on the particulate filter exceeds a predetermined upper limit quantity or when the difference exceeds the threshold value.

Preferably, the partition walls at the macropore zones have an average pore size of 25 μm to 100 μm.

Preferably, the partition walls are provided with common substrates for the micropore zones and macropore zones, the pore size of the substrates is set so that the ash can pass through the substrates, the substrate surfaces are covered by coated layers at the micropore zones, the substrate surfaces are not covered by coated layers at the macropore zones, and the pore size of the coating layers is set so that the particulate matter and the ash can be trapped.

Advantageous Effects of Invention

It is possible to reduce the risk of the particulate filter being damaged while suppressing an increase in pressure loss of a particulate filter due to ash.

DESCRIPTION OF EMBODIMENTS

Figure 1:
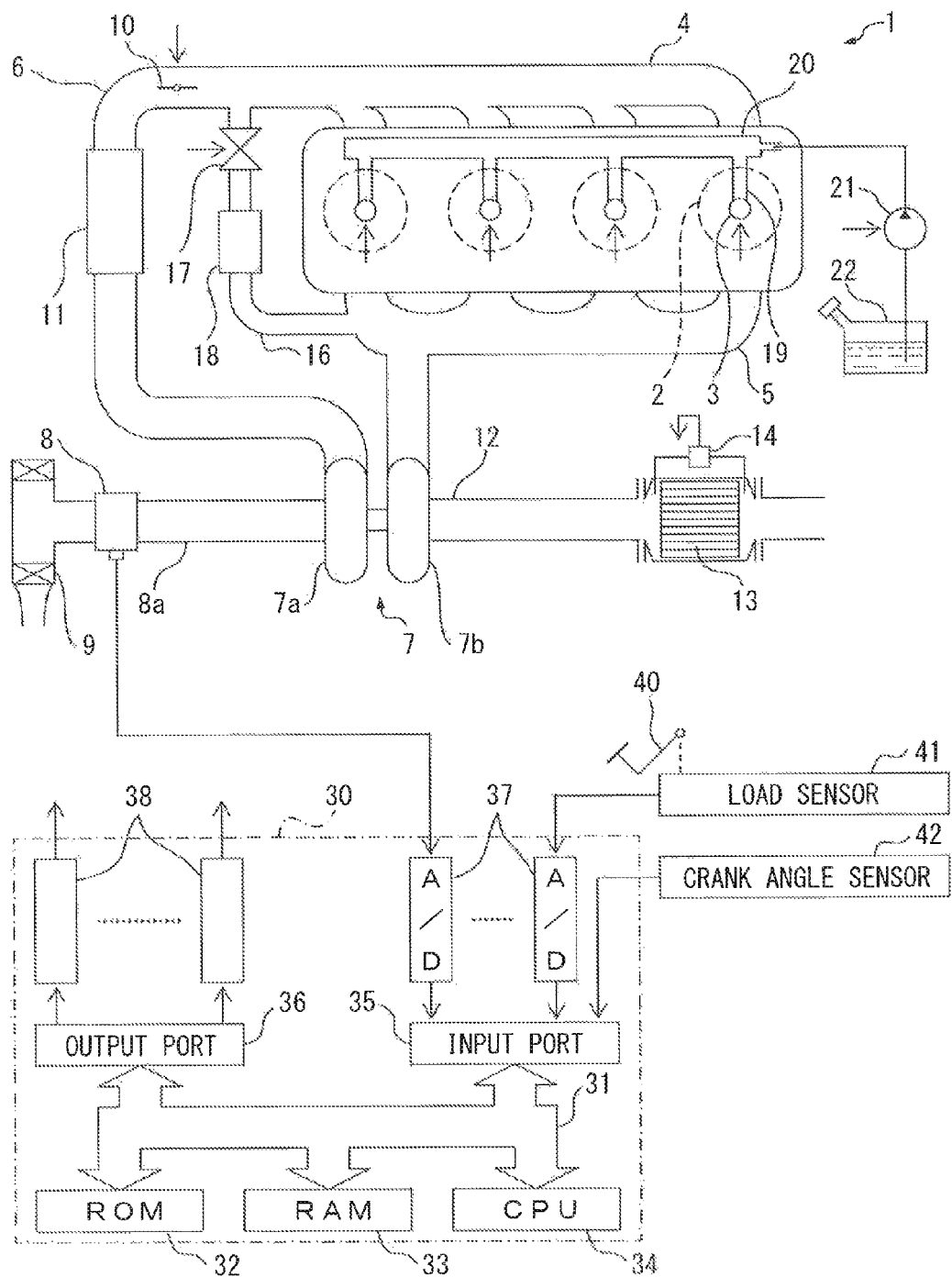
FIG. 1 is an overall view of an internal combustion engine of an embodiment according to the present invention.

Referring to FIG. 1, 1 indicates a body of a compression ignition type internal combustion engine, 2 indicates a combustion chamber of a cylinder, 3 indicates an electronic control type fuel injector for injecting fuel into a combustion chamber 2, 4 indicates an intake manifold, and 5 indicates an exhaust manifold. The intake manifold 4 is connected through an intake duct 6 to an outlet of a compressor 7a of an exhaust turbocharger 7, while an inlet of the compressor 7a is connected through an intake introduction pipe 8a in which an air flowmeter 8 is arranged to an air cleaner 9. Inside the intake duct 6, an electrical control type throttle valve 10 is arranged. Further, around the intake duct 6, a cooling device 11 is arranged for cooling the intake air which flows through the inside of the intake duct 6.

On the other hand, the exhaust manifold 5 is connected to the inlet of the exhaust turbine 7b of the exhaust turbocharger 7, while the outlet of the exhaust turbine 7b is connected through the exhaust pipe 12 to the particulate filter 13.

The exhaust manifold 5 and the intake manifold 4 are connected to each other through an exhaust gas recirculation (hereinafter referred to as "EGR") passage 16. Inside the EGR passage 16, an electrical control type EGR control valve 17 is arranged. Further, around the EGR passage 16, a cooling device 13 is arranged for cooling the EGR gas which flows through the inside of the EGR passage 16. On the other hand, each fuel injector 3 is connected through a fuel runner 19 to a common rail 20. This common rail 20 is connected through an electrical control type variable discharge fuel pump 21 to a fuel tank 22. The fuel which is stored in the fuel tank 22 is supplied by the fuel pump 21 to the inside of the common rail 20. The fuel which is supplied to the common rail 20 is supplied through the fuel runners 19 to the fuel injectors 3. Note that, in another embodiment which is not shown, the internal combustion engine 1 is comprised of a spark ignition type internal combustion engine.

The electronic control unit 30 is comprised of a digital computer which is provided with components which are connected together by a bidirectional bus 31 such as a ROM (read only memory) 32, RAM (random access memory) 33, CPU (microprocessor) 34, input port 35, and output port 36. At the particulate filter 13, a differential pressure sensor 14 is attached for detecting the pressure difference across the particulate filter 13. The output signals of the air flowmeter 8 and differential pressure sensor 14 are input through corresponding AD converters 37 to the input port 35. Further, an accelerator pedal 40 is connected to a load sensor 41 which generates an output voltage which is proportional to the amount of depression L of the accelerator pedal 40. The output voltage of the load sensor 41 is input through a corresponding AD converter 37 to the input port 35. Furthermore, the input port 35 is connected to a crank angle sensor 42 which generates an output pulse every time a crankshaft rotates by, for example, 15°. The CPU 34 uses the output pulses from the crank angle sensor 42 as the basis to calculate the engine speed Ne. On the other hand, the output port 36 is connected through corresponding drive circuits 38 to the fuel injectors 3, drive actuator of the throttle valve 10, EGR control valve 17, and fuel pump 21.

Figure 2A:
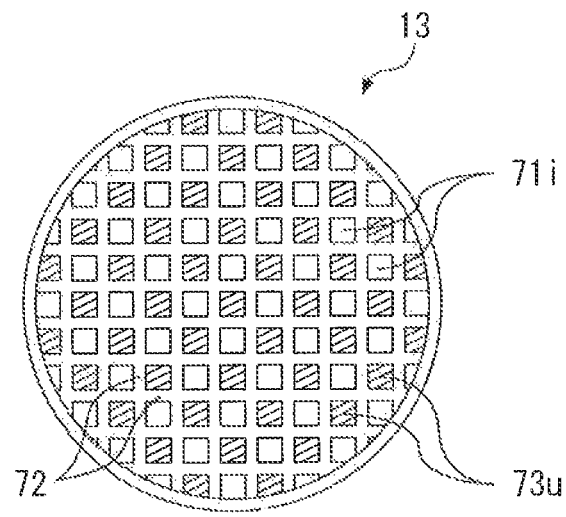
FIG. 2A is a front view of a particulate filter.
Figure 2B:
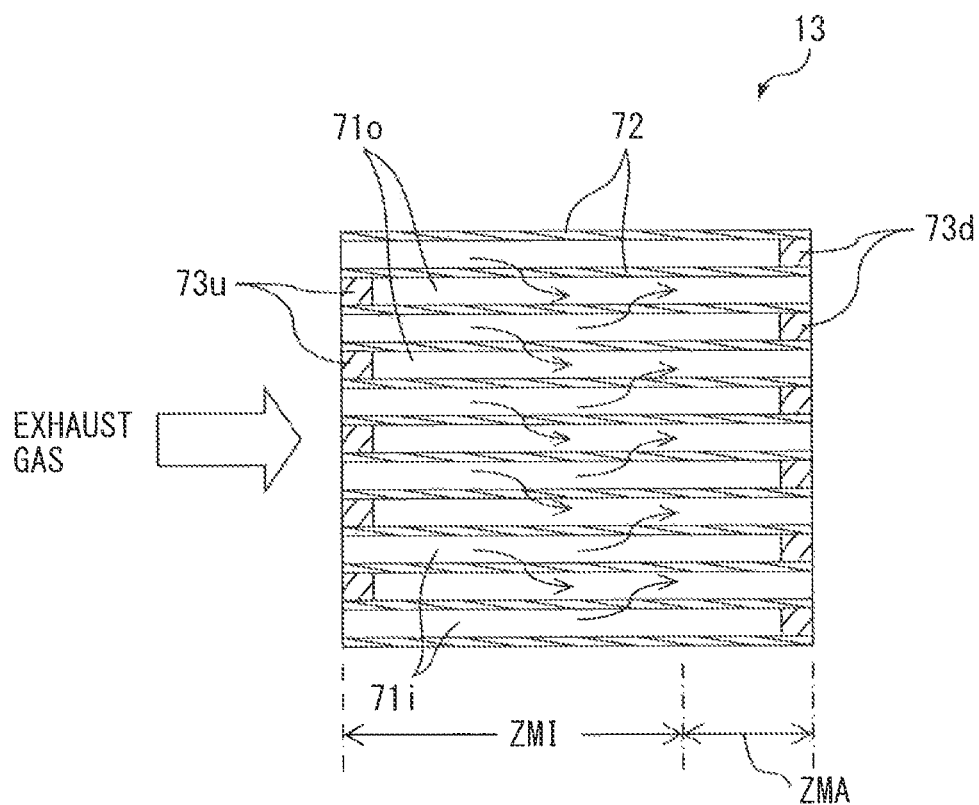
FIG. 2B is a side cross-sectional view of a particulate filter.

FIG. 2A and FIG. 2B shows the structure of the wall flow type particulate filter 13. Note that, FIG. 2A shows a front view of the particulate filter 13, while FIG. 2B shows a side cross-sectional view of the particulate filter 13. As shown in FIG. 2A and FIG. 2B, the particulate filter 13 forms a honeycomb structure which is provided with a plurality of exhaust flow passages 71$i$ and 71$o$ which extend in parallel with each other and partition walls 72 which separate these exhaust flow passages 71$i$ and 71$o$ from each other. In the embodiment which is shown in FIG. 2A, the exhaust flow passages 71$i$ and 71$o$ are comprised of exhaust gas inflow passages 71$i$ with upstream ends which are open and with downstream ends which are closed by stoppers 73$d$ and exhaust gas outflow passages 71$o$ with upstream ends which are closed by stoppers 73$u$ and downstream ends which are open. Note that, in FIG. 2A, the hatched parts show the stoppers 73$u$. Therefore, the exhaust gas inflow passages 71$i$ and the exhaust gas outflow passages 71$o$ are alternately arranged through thin partition walls 72. In other words, the exhaust gas inflow passages 71$i$ and the exhaust gas outflow passages 71$o$ are arranged so that each exhaust gas inflow passage 71$i$ is surrounded by four exhaust gas outflow passages 71$o$ and each exhaust gas outflow passage 71$o$ is surrounded by four exhaust gas inflow passages 71$i$. The partition walls 72 have porosity. Therefore, as shown in FIG. 23 by the arrows, the exhaust gas first flows into the exhaust gas inflow passages 71$i$, next passes through the surrounding partition walls 72, and flows out to the adjoining exhaust gas outflow passages 71$o$. In another embodiment which is not shown, the exhaust flow passages are comprised of exhaust gas inflow passages with upstream ends and downstream ends which are open and exhaust gas outflow passages with upstream ends which are closed by stoppers and with downstream ends which are open. In this embodiment as well, the exhaust gas which flows into the exhaust gas inflow passages passes through the partition walls and flows out to the exhaust gas outflow passages.

As shown in FIG. 2B, at the partition walls 72, micropore zones ZMI are defined at the upstream sides and macropore zones ZMA are defined at the downstream sides. In this case, the partition walls 72 at the micropore zones ZMI and the partition walls 72 at the macropore zones ZMA are integrally formed. The pore size of the partition walls 72 at the micropore zones ZMI is set to enable the particulate matter and the ash to be trapped. As opposed to this, the pore size of the partition walls 72 at the macropore zones ZMA is set to enable ash to pass through the partition walls 72 at the macropore zones ZMA. In this case, it is also possible to view the trapping efficiency of the particulate matter and ash at the partition walls 72 at the macropore zones ZMA as being set lower than the trapping efficiency of the particulate matter and ash at the partition walls 72 at the micropore zones ZMI.

Figure 3:
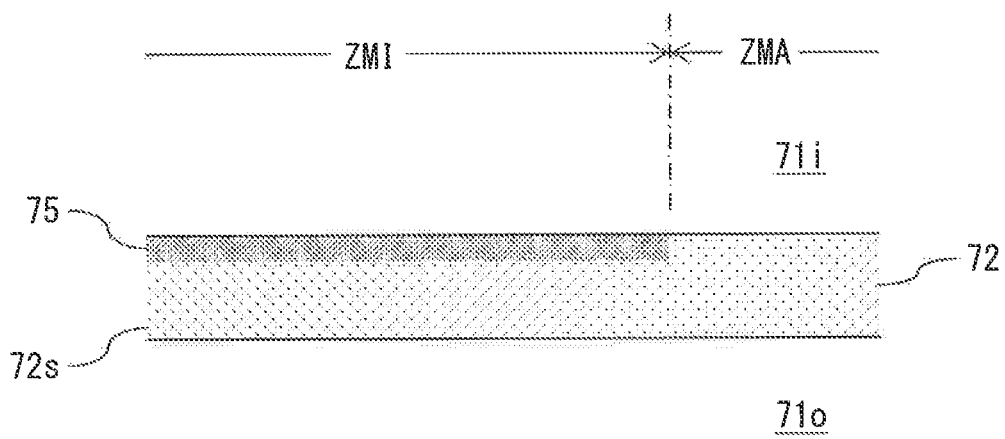
FIG. 3 is a partially enlarged cross-sectional view of a partition wall.
Figure 4:
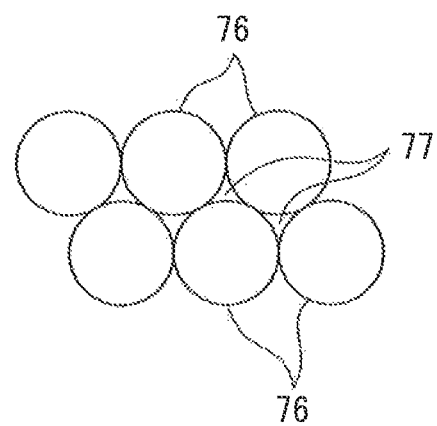
FIG. 4 is a partially enlarged cross-sectional view of a coated layer.

The micropore zones ZMI and macropore zones ZMA are, for example, formed as follows. That is, as shown in FIG. 3, the partition walls 72 are provided with common substrates 72s for the micropore zones ZMI and the macropore zones ZMA. In this case, the pore size of the substrates 72s is set so that the ash can pass through the substrates 72s. In addition to the above, at the micropore zones ZMI, the surfaces of the substrates 72s are covered by coated layers 75. The coated layers 75, as shown in FIG. 4, are formed from a large number of particles 76 and have a large number of gaps or pores 77 between the particles 76. The pore size of the coated layers 75 is set to be smaller than the pore size of the substrates 72s and to be able to trap the particulate matter and the ash. In this case, the pore size of the coated layers 75 expresses the pore size of the partition walls 72 at the micropore zones ZMI. As opposed to this, in the macropore zones ZMA, the surfaces of the substrates 72s are not covered by the above-mentioned coated layers 75. In this case, the pore size of the substrates 72 expresses the pore size of the partition walls 72 at the macropore zones ZMA. As a result, the pore size of the partition walls 72 at the micropore zones ZMI and the pore size of the partition walls 72 at the macropore zones ZMA are set as explained above.

Specifically, the average pore size of the substrates 72s, that is, the average pore size of the partition walls 72 at the macropore zones ZMA, is set to 25 μm to 100 μm. The fact that if the average pore size of the substrates 72s is 25 μm or more, the majority of the ash can pass through the substrates 72s was confirmed by the inventors. On the other hand, the average pore size of the coated layers 75, that is, the average pore size of the micropore zones ZMI, is set to 10 μm to 25 μm. For this reason, the average size of the particles 76 (secondary particles) is set to 1 μm to 10 μm. If the average particle size of the particles 76 is smaller than 1 μm, the quantity of particulate matter which passes through the coated layers 75 becomes greater than the allowed amount. Further, if the average size of the particles 76 is greater than 10 μm, the pressure loss of the particulate filter 13 or coated layers 75 becomes larger than the allowable value.

Note that, in the embodiment according to the present invention, the particle size of the pores of the partition wall substrates means the median size (50% size) of the distribution of pore size which is obtained by the mercury intrusion technique, while the average size of the particles means the median size (50% size) of the distribution of pore size based on volume which is obtained by the laser diffraction scattering method.

The substrates 72s are formed from a porous material, for example, cordierite, silicon carbide, silicon nitride, zirconia, titania, alumina, silica, muliite, lithium aluminum silicate, zirconium phosphate, or other ceramic. On the other hand, the particles 76 which form the coated layers 75 are, for example, comprised of a metal which has an oxidation function. As a metal which has an oxidation function, platinum Pt, rhodium Rh, palladium Pa, or other such platinum group metal may be used. In another embodiment which is not shown, the particles 76 are comprised of a ceramic similar to the partition wall substrates 72s. In still another embodiment which is not shown, the particles 76 are comprised of both ceramic and metal.

In the embodiment which is shown in FIG. 3, the coated layers 75 are provided on single surfaces of the partition wall substrates 72s which face the exhaust gas inflow passages 71i. In another embodiment which is not shown, the coated layers 75 are provided at single surfaces of the substrates 72s which face the exhaust gas outflow passages 71o. In still another embodiment which is not shown, the coated layers 75 are provided at both surfaces of the substrates 72s which face the exhaust gas inflow passages 71i and exhaust gas outflow passages 71o.

Furthermore, in the embodiment which is shown in FIG. 2B, the upstream edges of the micropore zones ZMI substantially match the upstream ends of the partition walls 72. Further, the downstream edges of the macropore zones ZMA substantially match the downstream ends of the partition walls 72. The longitudinal direction length of the micropore zones ZMI is set to, for example, 30% to 90% of the longitudinal direction length of the particulate filter 13.

Now then, the exhaust gas includes particulate matter which is formed mainly from solid carbon. This particulate matter is trapped on the particulate filter 13. As a result, the quantity of particulate matter which is discharged into the atmosphere is suppressed.

Further, exhaust gas contains noncombustible ingredients called "ash". The fact that this ash is mainly formed from calcium sulfate $CaSO_4$, calcium zinc phosphate $Ca_{19}Zn_2(PO_4)_{14}$, or other such calcium salts was confirmed by the inventors. The calcium Ca, zinc Zn, phosphorus P, etc. are derived from the engine lubrication oil, while the sulfur S is derived from the fuel. That is, explaining this taking as an example calcium sulfate $CaSO_4$, the engine lubrication oil flows into the combustion chambers 2 where it is burned. The calcium Ca in the lubrication oil bonds with the sulfur S in the fuel, whereby calcium sulfate $CaSO_4$ is formed. This ash is also trapped together with particulate matter on the particulate filter 13.

The behavior of the particulate matter and the ash in this case may be considered to be as follows: That is, the majority of the particulate matter and ash which flow into the particulate filter 13 is first trapped on the partition walls 72 at the micropore zones ZMI. Part of the particulate matter which is trapped on the partition walls 72 at the micropore zones ZMI next moves on the partition walls 72 due to the exhaust gas which flows through the insides of the exhaust gas inflow passages 71i and reaches the macropore zones ZMA. The particulate matter aggregates up until reaching the macropore zones ZMA, therefore some of the particulate matter which reaches the macropore zones ZMA becomes relatively large in size. Such relatively large sized particulate matter is trapped at the partition walls 72 at the macropore zones ZMA. On the other hand, for the relatively small sizes particulate matter, since the partition walls 72 at the macropore zones ZMA are relatively large in pore size, the particulate matter passes through the partition walls 72 at the macropore zones ZMA and flows out from the particulate filter 13.

As opposed to this, almost all of the ash which is trapped on the partition walls 72 at the micropore zones ZMI remains on the partition walls 72 at the micropore zones ZMI. This is because the quantity of particulate matter which flows into the particulate filter 13 is overwhelmingly greater than the quantity of ash which flows into the particulate filter 13 and it is difficult for the ash to move over the partition wall 72. This being said, sometimes the ash reaches the macropore zones ZMA. In this case, the ash passes through the partition walls 72 at the macropore zones ZMA and flows out from the particulate filter 13. This is because the quantity of ash which is trapped on the particulate filter 13 is relatively small, so even if the ash aggregates, the size of the ash which reaches the macropore zones ZMA is not that large.

Figure 5:
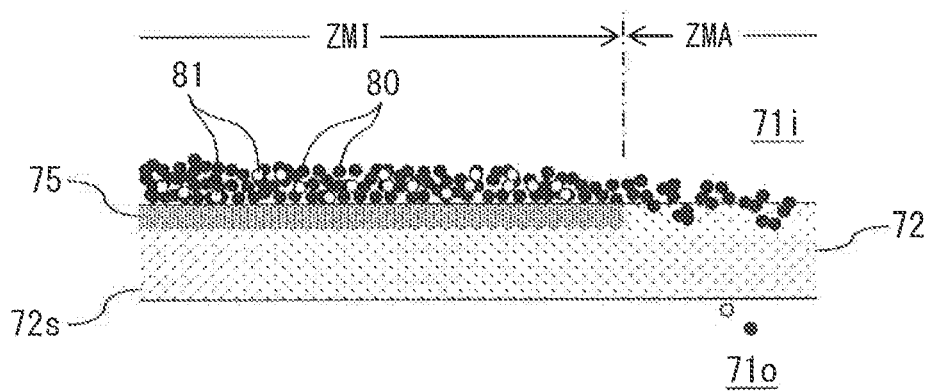
FIG. 5 is a schematic enlarged view of a partition wall for explaining an embodiment according to the present invention.

As a result, generally speaking, as shown in FIG. 5, the particulate matter 80 and the ash 61 are trapped on the partition walls 72 at the micropore zones ZMI, while the particulate matter 80 is trapped on the partition walls 72 at the macropore zones ZMA.

In this regard, as the engine operating time becomes longer, the quantity of particulate matter which is trapped on the particulate filter 13 becomes greater and, as a result, the pressure loss of the particulate filter 13 ends up becoming larger.

Therefore, in the embodiment according to the present invention, PM removal control is executed to remove particulate matter from the particulate filter 13. As a result, the quantity of trapped particulate matter on the particulate filter 13 is decreased and the pressure loss of the particulate filter 13 is made to fall.

In the embodiment according to the present invention, PM removal control is comprised of control for increasing the temperature which increases the temperature of the particulate filter 13 to a PM removal temperature and maintains the same to the PM removal temperature while maintaining the particulate filter 13 in an oxidizing atmosphere. In one embodiment, the fuel injector 3 injects additional fuel in the compression stroke or exhaust stroke separate from the main fuel for combustion use. Control for increasing the temperature is executed by this additional fuel burning in the combustion chambers 2, exhaust passage, or particulate filter 13. In another embodiment, a fuel adding valve which is arranged upstream of the particulate filter 13 in the exhaust passage adds additional fuel and control for increasing the temperature is executed by this additional fuel burning at the exhaust passage or particulate filter 13. Note that the PM removal temperature is, for example, set to 600° C. to 650° C.

Figure 6:
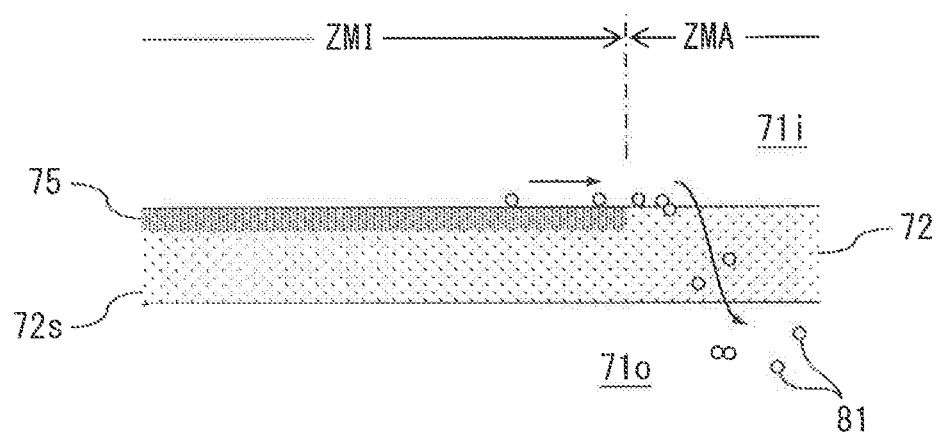
FIG. 6 is a schematic enlarged view of a partition wall for explaining an embodiment according to the present invention.

Even if PM removal control is executed, the ash will not burn but will remain on the partition walls 72 at the micropore zones ZMI. In this regard, if PM removal control is executed, the particulate matter on the partition wall 72 is removed, so the ash easily moves on the partition walls 72. As a result, as shown in FIG. 6, the ash moves on the partition walls 72 to the rear of the particulate filter 13 due to the exhaust gas which flows through the exhaust gas inflow passages 71i, then passes through the partition walls 72 at the macropore zones ZMA and flows out from the particulate filter 13. Therefore, the ash is kept from causing the pressure loss of the particulate filter 13 to rise.

In the embodiment according to the present invention, PM removal control is executed when the total quantity QPMT of particulate matter which is trapped on the particulate filter 13 exceeds a predetermined upper limit quantity QPMTL. In other words, the PM removal control is executed before the total quantity of trapped particulate matter QPMT becomes great. As a result, the pressure loss of the particulate filter 13 is maintained low. Note that, the total quantity of trapped particulate matter QPMT is expressed by the sum of the quantity of particulate matter QPM(ZMI) which is trapped on the partition walls 72 at the micropore zones ZMI and the quantity of particulate matter QPM(ZMA) which is trapped on the partition walls 72 at the macropore zones ZMA (QPMT=QPM(ZMI)+ZPM(ZMA)).

Further, in the embodiment according to the present invention, PM removal control is executed when the difference dQPM (=QPM(ZMI)−QPM(ZMA)) between the quantity of particulate matter QPM(ZMI) which is trapped on the partition walls 72 at the micropore zones ZMI and the quantity of particulate matter QPM(ZMA) which is trapped on the partition walls 72 at the macropore zones ZMA exceeds a predetermined threshold value dQPML. In other words, PM removal control is executed before the difference dQPM becomes large. As a result, it is possible to decrease the temperature difference between the partition walls 72 at the micropore zones ZMI and the partition walls 72 at the macropore zones ZMA which occurs when PM removal control is executed and therefore possible to reduce the risk of the particulate filter 13 being damaged by heat.

Figure 7:
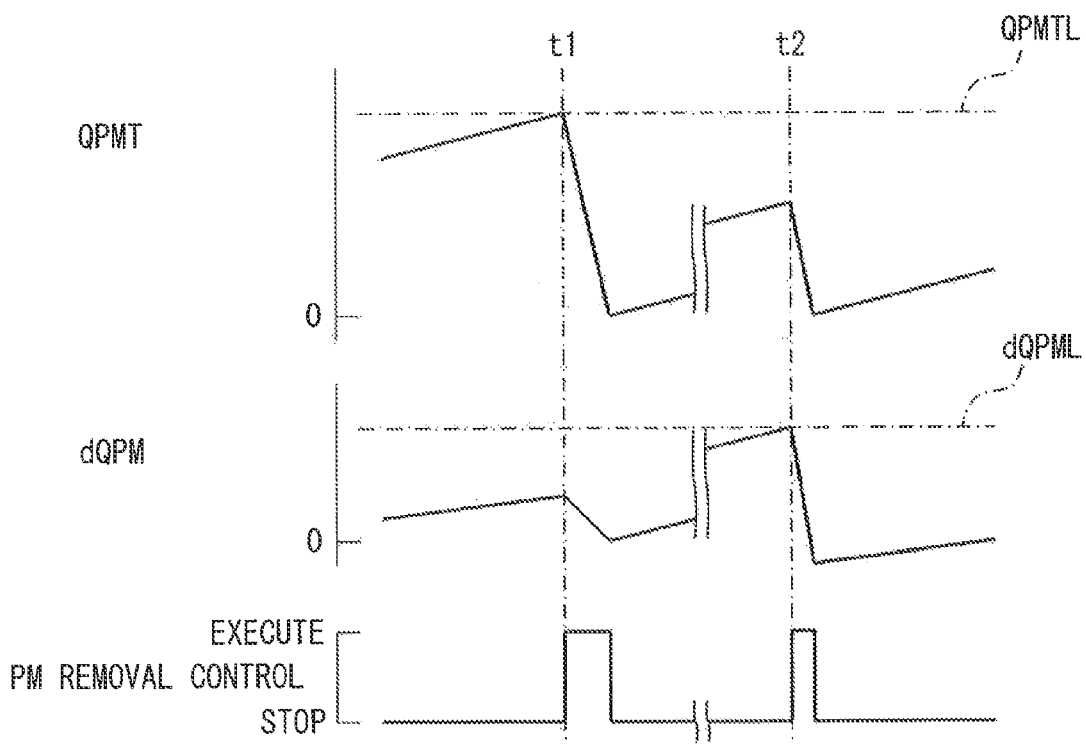
FIG. 7 is a time chart which explains PM removal control.

That is, as shown in FIG. 7, at the time t1, PM removal control is executed when the total quantity of trapped particulate matter QPMT exceeds the upper limit quantity QPMTL. Further, at the time t2, PM removal control is executed even when the difference dQPM exceeds the threshold value dQPML. If PM removal control is executed, the quantity of trapped particulate matter QPM(ZMI) at the micropore zones ZMI and the quantity of trapped particulate matter QPM(ZMA) at the macropore zones ZMA are reduced and therefore the total quantity of trapped particulate matter QPMT and difference dQPM are reduced.

Note that, at the time t1, PM removal control is executed when the total quantity of trapped particulate matter QPMT exceeds the upper limit quantity QPMTL and the difference dQPM does not exceed the threshold value dQPML. On the other hand, at the time t2, PM removal control is executed when the total quantity of trapped particulate matter QPMT does not exceed the upper limit quantity QPMTL and the difference dQPM exceeds the threshold value dQPML. In other words, PM removal control is executed when the total quantity of trapped particulate matter QPMT exceeds the upper limit quantity QPMTL or the difference dQPM exceeds the threshold value dQPML.

In either case, when the total quantity of trapped particulate matter QPMT on the particulate filter 13 decreases to the set value, for example, zero, the PM removal control is ended. The total quantity of trapped particulate matter QPMT is expressed by, for example, the differential pressure across the particulate filter 13 which is detected by the differential pressure sensor 14. In another embodiment which is not shown, if a predetermined time elapses from when PM removal control is started, the PM removal control is ended.

If representing the quantity of particulate matter which flows into the particulate filter 13 per unit time by qPM and the trapping efficiency of the particulate matter on the partition walls 72 at the micropore zones ZMI by TE(ZMI), the quantity of particulate matter QPM(ZMI) which is trapped on the partition walls 72 at the micropore zones ZMI is expressed by the following formula:

QPM(ZMI)=QPM(ZMI)+qPM·Te(ZMI)

On the other hand, if representing the trapping efficiency of the particulate matter on the partition walls 72 at the macropore zones ZMA by TE(ZMA), the quantity of particulate matter QPM(ZMA) which is trapped on the partition walls 72 at the macropore zones ZMA is expressed by the following formula:

QPM(ZMA)=QPM(ZMA)+qPM·(1−TE(ZMI))·TE(ZMA)

where qPM·(1−TE(ZMI)) expresses the quantity of particulate matter which reaches the exhaust gas inflow passages 71i at the macropore zones ZMA.

The quantity of inflowing particulate matter qPM per unit time is stored in the form of the map which is shown in FIG.

Figure 9:
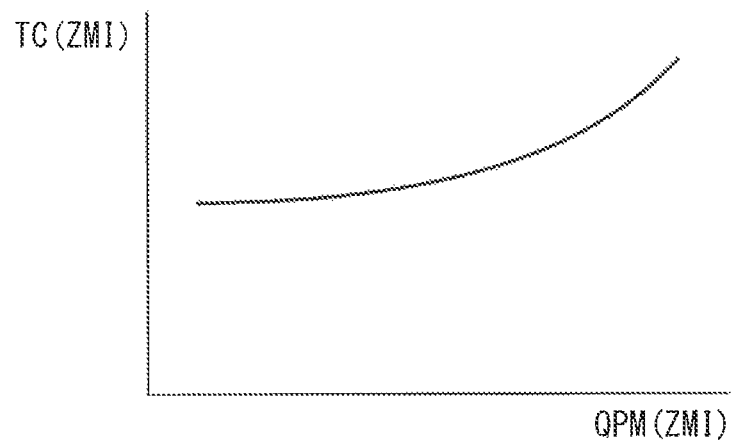
FIG. 9 is a view which shows a map of the particulate matter trapping efficiency TC(ZMI) at the micropore zones.
Figure 10:
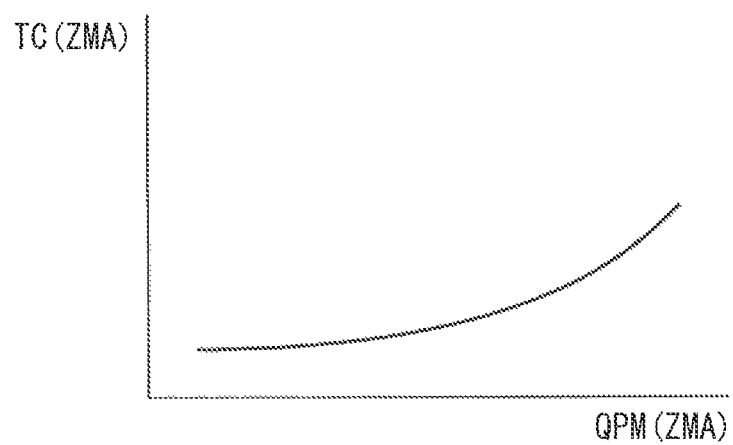
FIG. 10 is a view which shows a map of the particulate matter trapping efficiency TC(ZMA) at the macropore zones.

8 as a function of the amount of depression L of the accelerator pedal 40 which expresses the engine load and the engine speed E in advance in the ROM 32. On the other hand, the trapping efficiency TE(ZMI) at the micropore zones ZMI becomes higher the greater the quantity of trapped particulate matter QPM(ZMI) at the micropore zones ZMI. The trapping efficiency TE(ZMI) at the micropore zones ZMI is stored as a function of the quantity of trapped particulate matter QPM(ZMI) at the micropore zones ZMI in the form of the map which is shown in FIG. 9 in advance in the ROM 32. Further, the trapping efficiency TE(ZMA) at the macropore zones ZMA becomes higher the greater the quantity of trapped particulate matter QPM (ZMA) at the macropore zones ZMA. The trapping efficiency TE(ZMA) at the macropore zones ZMA is stored as a function of the quantity of trapped particulate matter QPM(ZMA) at the macropore zones ZMA in the form of the map which is shown in FIG. 10 in advance in the ROM 32. Therefore, if calculating the quantity of inflowing particulate matter qPM and trapping efficiencies TE(ZMI) and TE(ZMA) per unit time, the quantities of trapped particulate matter QPM(ZMI) and QPM(ZMA) can be calculated.

Figure 11:
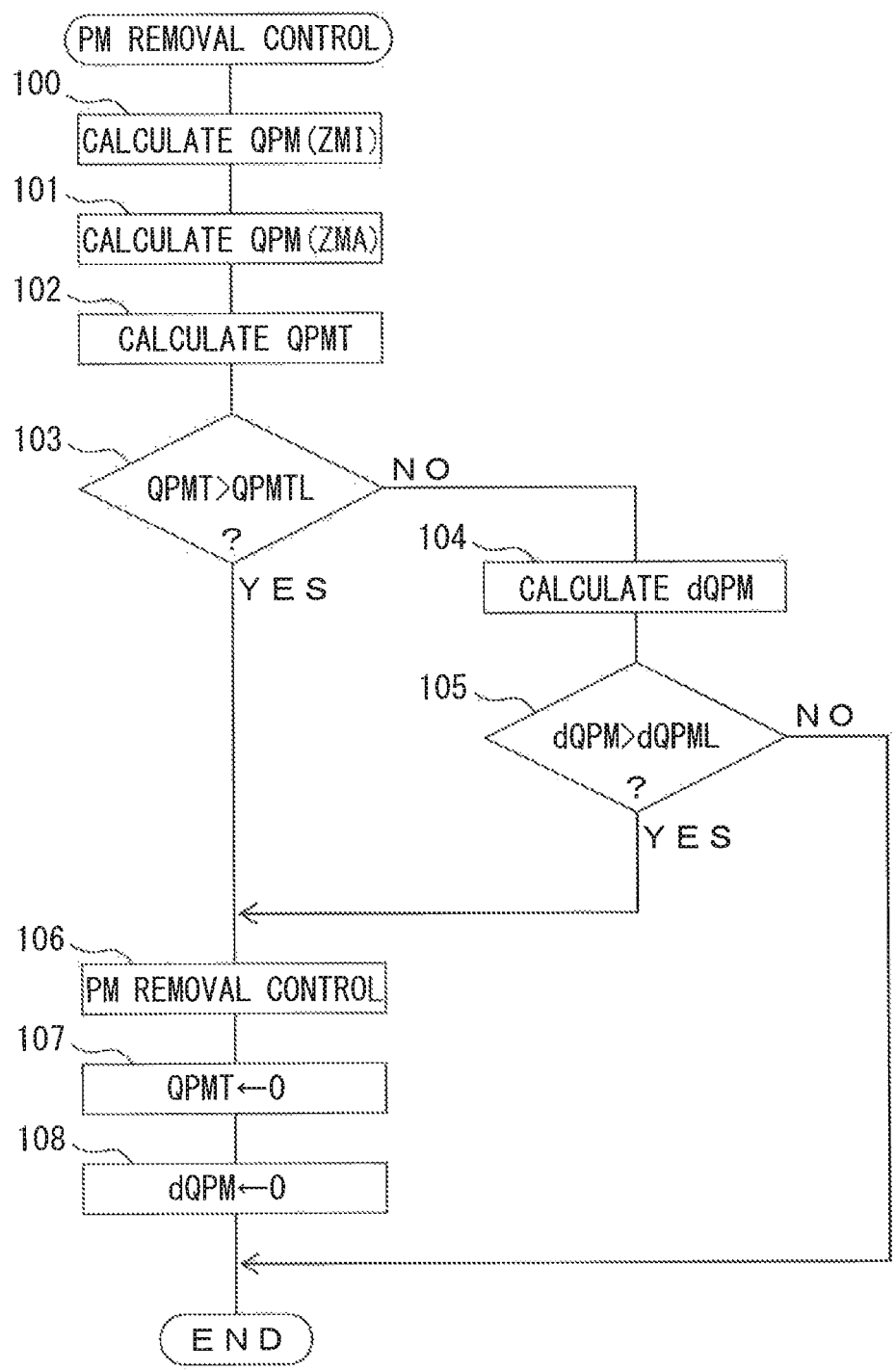
FIG. 11 is a flow chart which shows a routine for PM removal control.

FIG. 11 shows the routine for PM removal control. This routine is executed by interruption every predetermined set time period.

Figure 8:
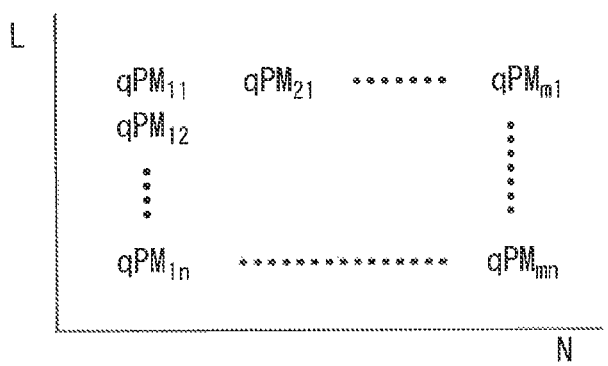
FIG. 8 is a view which shows a map of a quantity of inflowing particulate matter qPM.

Referring to FIG. 11, at step 100, the quantity of inflowing particulate matter qPM per unit time is calculated from the map of FIG. 8, the trapping efficiency TE(ZMI) at the micropore zones ZMI is calculated from the map of FIG. 9, and the quantity of trapped particulate matter QPM(ZMI) at the micropore zones ZMI is calculated (QPM(ZMI)=QPM (ZMI)+qPM·TE(ZMI)). At the following step 101, the trapping efficiency TE(ZMA) at the macropore zones ZMA is calculated from the map of FIG. 10, and the quantity of trapped particulate matter QPM(ZMA) at the macropore zones ZMA is calculated (QPM(ZMA)=QPM(ZMA)+qPM· (1−TE(ZMI))·TE(ZMA)). At the following step 102, the total quantity of trapped particulate matter QPMT is calculated (QPMT=QPM(ZMI)+QPM(ZMA)). At the following step 103, it is judged if the total quantity of trapped particulate matter QPMT has exceeded the upper limit quantity QPMTL. When QPMT≤QPMTL, next the routine proceeds to step 104 where the difference dQPM is calculated (dQPM=QPM(ZMI)−QPM(ZMA)). At the following step 105, it is judged if the difference dQPM has exceeded threshold value dQPML. When dQPM≤dQPML, the processing cycle is ended.

When, QPMT>QPMTL at step 103 or dQPM>dqPML at step 105, next the routine proceeds to step 106 where PM removal control is executed. At the following step 107, the total quantity of trapped particulate matter QPMT is set to zero. At the following step 108, the difference dQPM is set to zero.

In the embodiment according to the present invention explained up to here, the macropore zones ZMA are not provided with coated layers. In another embodiment, which is not shown, the macropore zones ZMA are provided with separate coated layers which are different from the coated layers 75. In this case, the average pore size of the partition walls 72 at the macropore zones ZMA is set to 25 µm to 100 µm in the state where the separate coated layers are provided. The separate coated layers are formed from, for example, catalyst coated layers which carry a metal which has an oxidation function. As a result, it is easy to remove by oxidation the particulate matter which reaches the macropore zones ZMA.

REFERENCE SIGNS LIST 1 engine body
12 exhaust pipe
13 particulate filter
71i exhaust gas inflow passages
71o exhaust gas outflow passages
72 partition wall
ZMA macropore zone
ZMI micropore zone

The invention claimed is:

1. An exhaust purification system for an internal combustion engine, the exhaust purification system comprising:
    a particulate filter for trapping particulate matter which is contained in exhaust gas in an engine exhaust passage, where the particulate filter is provided with alternately arranged exhaust gas inflow passages and exhaust gas outflow passages and porous partition walls which separate these exhaust gas inflow passages and exhaust gas outflow passages from each other, micropore zones being defined at upstream sides of the partition walls, and macropore zones being defined at downstream sides of the partition walls, wherein:
    a pore size of the partition walls in the micropore zones is set so that particulate matter and ash can be trapped by the partition walls at the micropore zones,
    a pore size of the partition walls in the macropore zones is set so that ash can pass through the partition walls at the macropore zones, and
    the partition walls at the micropore zones and the partition walls at the macropore zones are integrally formed;
    a fuel valve configured to supply fuel for increasing a temperature of the particulate filter; and
    an electronic control unit configured to:
        determine a quantity of particulate matter which flows into the particulate filter per unit time:
        calculate a difference between the quantity of the particulate matter which is trapped on the partition walls at the micropore zones and the quantity of particulate matter which is trapped on the partition walls at the macropore zones based on the quantity of particulate matter which flows into the particulate filter per unit time, and
        execute PM removal control when the difference between the quantity of the particulate matter which is trapped on the partition walls at the micropore zones and the quantity of particulate matter which is trapped on the partition walls at the macropore zones exceeds a predetermined threshold value by increasing the temperature of the particulate filter to a PM removal temperature and maintaining the PM removal temperature using the fuel valve while maintaining the particulate filter in an oxidizing atmosphere in order to remove the particulate matter on the particulate filter.

2. The exhaust purification system for an internal combustion engine according to claim 1, wherein PM removal control is executed when the total amount of the particulate matter which is trapped on the particulate filter exceeds a predetermined upper limit quantity and when said difference exceeds said threshold value.

3. The exhaust purification system for an internal combustion engine according to claim 1, wherein said partition walls at the macropore zones have an average pore size of 25 µm to 100 µm.

4. The exhaust purification system for an internal combustion engine according to claim 1, wherein said partition walls are provided with common substrates for the micropore zones and macropore zones, the pore size of the substrates is set so that the ash can pass through the substrates, the substrate surfaces are covered by coated layers at the micropore zones, the substrate surfaces are not covered by the coated layers at the macropore zones, and the pore size of the coated layers is set so that the particulate matter and the ash can be trapped.

5. The exhaust purification system for an internal combustion engine according to claim 1, wherein the electronic control unit is configured to:

calculate the quantity of the particulate matter which is trapped on the partition walls at the micropore zones and the quantity of particulate matter which is trapped on the partition walls at the macropore zones, respectively, based on the quantity of particulate matter which flows into the particulate filter per unit time.

6. The exhaust purification system for an internal combustion engine according to claim 5, wherein the electronic control unit is configured to:

determine a trapping efficiency of the particulate matter on the partition walls at the micropore zones based on the calculated quantity of the particulate matter which is trapped on the partition walls at the micropore zones, recalculate the quantity of the particulate matter which is trapped on the partition walls at the micropore zones based on the calculated quantity of the particulate matter which is trapped on the partition walls at the micropore zones, the quantity of particulate matter which flows into the particulate filter per unit time, and the trapping efficiency of the particulate matter on the partition walls at the micropore zones, determine a trapping efficiency of the particulate matter on the partition walls at the macropore zones based on the calculated quantity of the particulate matter which is trapped on the partition walls at the macropore zones, recalculate the quantity of the particulate matter which is trapped on the partition walls at the macropore zones based on the calculated quantity of the particulate matter which is trapped on the partition walls at the macropore zones, the quantity of particulate matter which flows into the particulate filter per unit time, and the trapping efficiency of the particulate matter on the partition walls at the macropore zones, and calculate the difference based on the recalculated quantity of the particulate matter which is trapped on the partition walls at the micropore zones and the recalculated quantity of particulate matter which is trapped on the partition walls at the macropore zones.

7. The exhaust purification system for an internal combustion engine according to claim 1, wherein the electronic control unit is configured to determine the quantity of particulate matter which flows into the particulate filter per unit time based on an engine load and engine speed.

8. The exhaust purification system for an internal combustion engine according to claim 5, wherein the electronic control unit is configured to determine the quantity of particulate matter which flows into the particulate filter per unit time based on an engine load and engine speed.

9. The exhaust purification system for an internal combustion engine according to claim 6, wherein the electronic control unit is configured to determine the quantity of particulate matter which flows into the particulate filter per unit time based on an engine load and engine speed.

* * * * *